(12) United States Patent
Boguslawski

(10) Patent No.: US 10,085,552 B2
(45) Date of Patent: Oct. 2, 2018

(54) ADJUSTABLE RACK APPARATUS

(71) Applicant: Bosski, Inc., Fall Creek, ID (US)

(72) Inventor: John Boguslawski, Fall Creek, ID (US)

(73) Assignee: Bosski, Inc., Fall Creek, ID (US)

( * ) Notice: Subject to any disclaimer, the term of this patent is extended or adjusted under 35 U.S.C. 154(b) by 0 days.

(21) Appl. No.: 15/044,954

(22) Filed: Feb. 16, 2016

(65) Prior Publication Data

US 2017/0232906 A1   Aug. 17, 2017

(51) Int. Cl.
    *A47B 45/00*    (2006.01)
    *A47B 81/00*    (2006.01)
    *B60R 9/045*    (2006.01)

(52) U.S. Cl.
    CPC .............. *A47B 45/00* (2013.01); *A47B 81/00* (2013.01); *B60R 9/045* (2013.01)

(58) Field of Classification Search
    CPC . B60R 9/065; B60R 2011/0085; B60R 9/045; A47B 45/00; A47B 46/00; A47B 46/005; A47B 51/00; A47B 77/10; A47B 2088/901; A47B 81/00; B62D 33/023; B62D 33/027; B62D 33/0276; B62D 33/0207; B25H 3/023; B66F 9/04; A47L 15/506; A47L 15/504; A47L 15/507
    USPC ....... 224/404, 401, 433, 495, 497–499, 432, 224/314, 42.34; 296/37.6, 26.02, 100.09, 296/26.06, 26.11, 183.2, 181.1, 182.1, 296/183.1, 3; 414/471, 501; 298/11, 298/22 R; 312/172, 270.1, 270.2, 309, 312/266, 27, 219.1, 246, 24, 310, 311, 312/247, 248, 319.1, 319.2, 319.3, 319.5, 312/319.7, 272.5, 249.7, 325, 228.1, 295, 312/269, 271
    See application file for complete search history.

(56) References Cited

U.S. PATENT DOCUMENTS

| | | | | |
|---|---|---|---|---|
| 1,652,984 A | * | 12/1927 | Hixson | .................. B25H 3/023 190/29 |
| 2,590,341 A | * | 3/1952 | Nabholz | ................ A47B 21/02 16/307 |
| 3,081,138 A | * | 3/1963 | Stebbins | ................ A47B 46/00 312/319.3 |
| 3,744,653 A | * | 7/1973 | Jensen | ...................... B60P 1/32 15/340.1 |
| 3,801,279 A | * | 4/1974 | Grieco | ...................... A61L 2/26 134/135 |

(Continued)

*Primary Examiner* — Hiwot E Tefera
(74) *Attorney, Agent, or Firm* — Seed IP Law Group LLP; Chandra E. Eidt

(57) ABSTRACT

The present invention relates to an adjustable rack apparatus that increases the storage, protection, accessibility, security, safety, and organization potential for items packed, for example, utility vehicle beds. The adjustable rack apparatus may be used in conjunction with a storage box that is either fixed to, separate from, or separable from, the adjustable rack. The adjustable rack apparatus comprises a frame, a fixed length rotatable arm, a variable length arm, and an adjustable storage rack. Level substantially vertical movement of the adjustable storage rack is achieved by proper positioning of the fixed length rotatable arms and the variable length arms relative to each other and the frame and the adjustable storage rack. Changing the length of the variable length arm causes movement of the fixed length rotatable arm and level substantially vertical movement of the storage rack.

19 Claims, 10 Drawing Sheets

(56) References Cited

U.S. PATENT DOCUMENTS

| | | | | |
|---|---|---|---|---|
| 4,019,781 | A * | 4/1977 | Ray | B60P 1/20 296/183.2 |
| 4,076,351 | A * | 2/1978 | Wyant | A47B 46/005 248/280.11 |
| 4,150,861 | A * | 4/1979 | Dufrancatel | A47B 46/005 312/266 |
| 5,029,935 | A * | 7/1991 | Dufrancatel | B60P 3/36 126/276 |
| 5,203,364 | A * | 4/1993 | Koole | B60P 3/42 135/148 |
| 5,275,526 | A * | 1/1994 | Moseley | B65G 69/24 414/495 |
| 5,308,158 | A * | 5/1994 | Vogelgesang | A47B 77/10 211/170 |
| 5,868,453 | A * | 2/1999 | Steigner | B60P 3/40 296/100.1 |
| 5,964,492 | A * | 10/1999 | Lyon | B60R 9/00 224/404 |
| 6,357,990 | B1 * | 3/2002 | Moseley | B66F 9/04 14/72.5 |
| 6,402,453 | B1 * | 6/2002 | Jensen | B30B 9/3042 298/18 |
| 6,439,667 | B1 * | 8/2002 | Weets | B60P 1/165 298/11 |
| 6,474,714 | B1 * | 11/2002 | Stettner | B60P 3/42 280/638 |
| 7,055,878 | B2 * | 6/2006 | Imhof | B60P 3/32 296/26.07 |
| 7,704,035 | B2 * | 4/2010 | Borntrager | B62D 51/04 187/231 |
| 8,162,190 | B2 * | 4/2012 | Hanson | B60R 9/00 224/404 |
| 8,267,454 | B2 * | 9/2012 | Takano | B60N 2/24 296/26.02 |
| 8,777,338 | B2 * | 7/2014 | Bunch | A47B 46/005 312/248 |
| 2001/0050490 | A1 * | 12/2001 | De Gaillard | B62D 33/0276 296/26.02 |
| 2005/0017480 | A1 * | 1/2005 | Paganini | A47F 5/137 280/638 |
| 2007/0018545 | A1 * | 1/2007 | Calabria | A47B 77/10 312/311 |
| 2010/0314271 | A1 * | 12/2010 | Baruch | A47B 43/00 206/349 |
| 2012/0193932 | A1 * | 8/2012 | King | B60P 3/423 296/26.11 |
| 2015/0035309 | A1 * | 2/2015 | Clark | B60J 7/1621 296/100.07 |
| 2015/0130343 | A1 * | 5/2015 | Morris | F25D 23/026 312/404 |

* cited by examiner

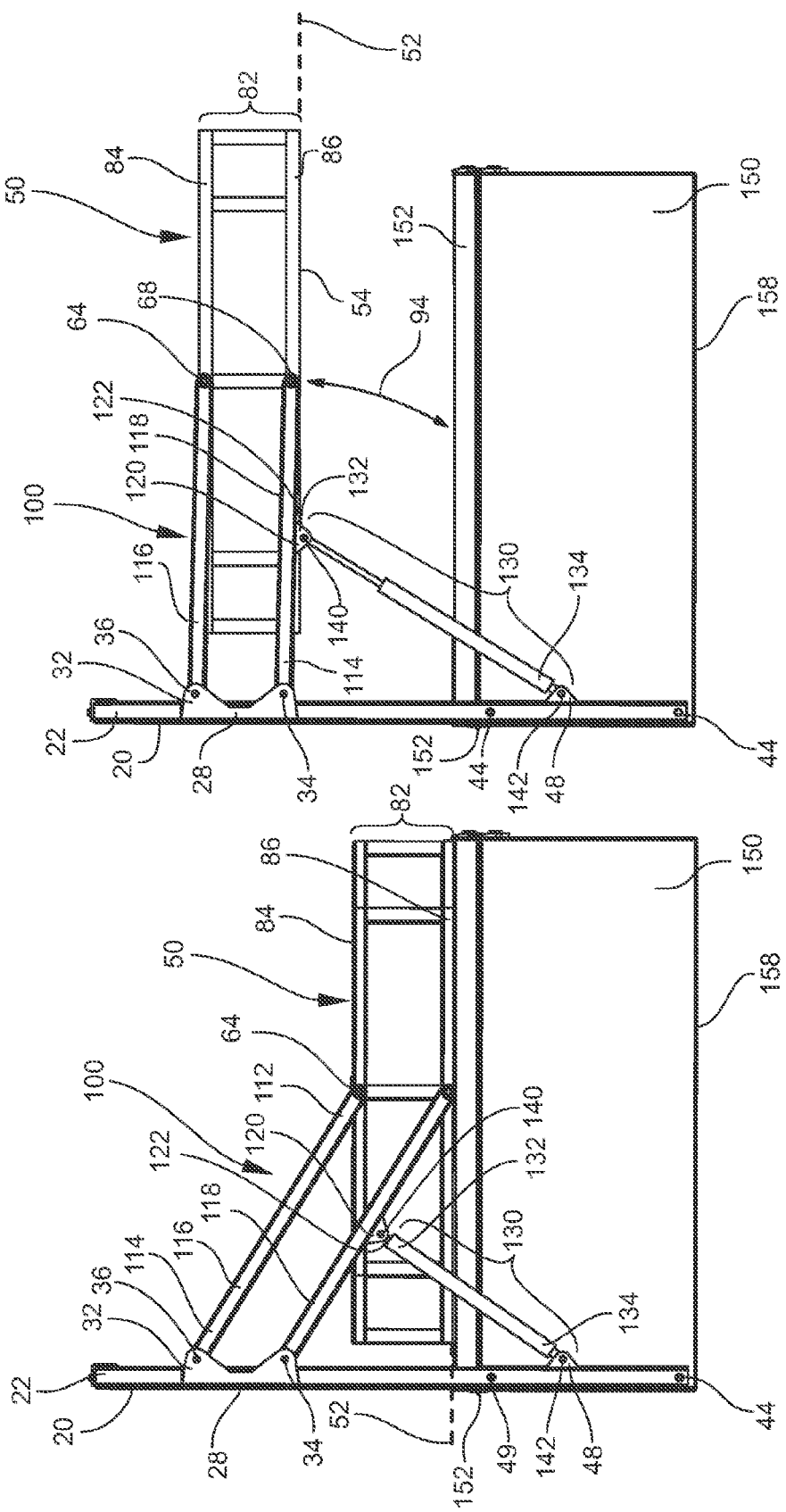

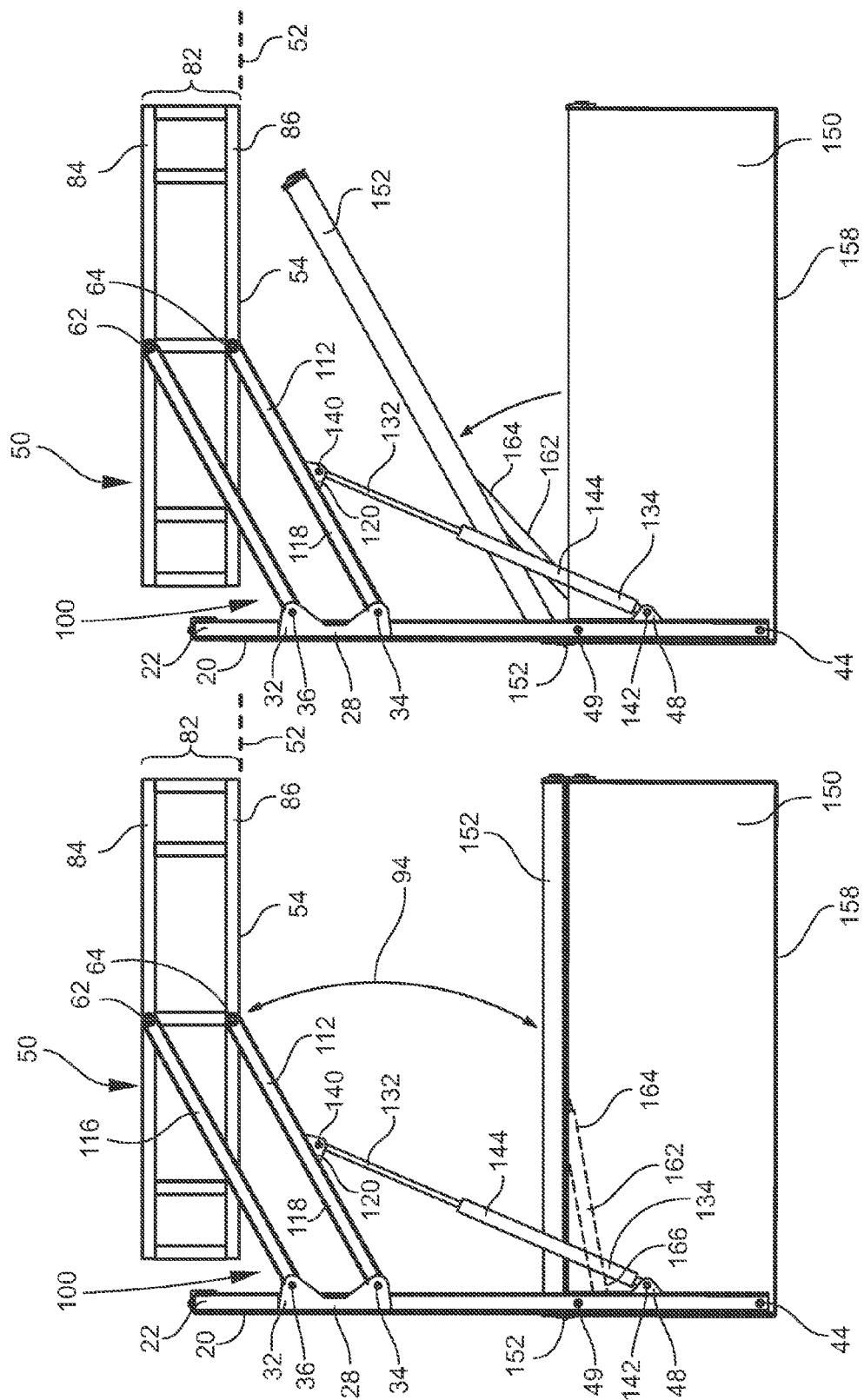

ADJUSTABLE RACK APPARATUS

FIELD OF THE INVENTION

The present invention relates to an adjustable rack apparatus that increases the storage, accessibility, security, and organization potential for items packed or transported in, for example, utility vehicle beds. The adjustable rack apparatus comprises one or more of a frame, a fixed length rotatable arm, a variable length arm, and an adjustable storage rack. The adjustable rack apparatus may be used in conjunction with a storage box that is either fixed to, separate from, or separable from, the adjustable rack. Level vertical movement of the adjustable storage rack may be achieved by proper positioning of a fixed length rotatable arm and a variable length arm relative to each other and the storage rack and the frame. Changing the length of the variable length arm causes rotatable movement of the fixed length rotatable arm that, in turn, causes a corresponding level substantially vertical movement of the storage rack either up or down.

BACKGROUND

Recreational users of utility vehicles often spend extended periods of time out in their vehicles and away from the conveniences of home. Accordingly, these users need to carry items with them to ensure their safety, well-being, and to maximize enjoyment of their vehicles. Items carried in utility vehicle beds are often piled one on top of the other which frustrates the user's ability to quickly and easily access carried items. Further, such items are subject to breakage or movement when the utility vehicle is in use. Carried items may also be exposed to environmental hazards such as water, dirt, mud, wind, and vacillation in temperatures. Additionally, conventional packing of items in utility vehicle beds results in items that are not properly secured to the vehicle such that these items may be lost or stolen. Further, packing of items with heavier items stacked higher in the utility vehicle bed may result in an unsafe altered center or gravity or vehicle balance. There is a need for improved storage, protection, safety, accessibility, security, and organization of items carried in utility vehicle beds. Further, there is a need for an adjustable rack apparatus that facilitates the packing and transport of carried items with a lowered or maximally lowered center of gravity to enable safer operation of the utility vehicle.

SUMMARY

The present invention provides a new and improved adjustable rack apparatus for transporting, protecting, storing, accessing, securing, and organizing items in a utility vehicle bed, and features a substantially vertically movable adjustable storage rack that provides a level, or substantially level, loading surface throughout the full range of its arcuate or substantially vertical motion, and that facilitates achieving a safer lower center of gravity for a packed utility vehicle.

The adjustable rack apparatus may comprise a frame, a fixed length rotatable arm, a variable length arm, and a storage rack. Each of the fixed length rotatable arm, variable length arm, and storage rack are interconnected movable components, and each component is movable relative to, or in tandem with, the movement of the other components. The fixed length rotatable arm and variable length arm are each attached to a separate frame or to another stationary surface, such as, for example, the utility vehicle bed or an optional storage box, at one end and provide for movable or rotational movement at an opposite end. Each of the fixed length rotatable arm and variable length arm is also further movably or rotatably joined to the other.

In a preferred embodiment, the storage rack is not permanently attached to the frame or to any static surface. In some embodiments, however, the storage rack optionally may be temporarily separately locked or secured to a frame or to another static surface.

The utility vehicle may be any sort of wheeled transportation or tracked transport and may comprise, for example, a utility vehicle (UTV), a jeep, all-terrain vehicles (ATVs) such as, for example quads, quad bikes, three-wheelers, four-wheelers, or quadricycles, etc.

As used throughout this description, and except as otherwise called out in any preferred embodiments, it is to be understood that the terms rotate, rotatable, and rotational include reference to, or may be interpreted as, any other suitable movement such as, for example, revolving, turning, moving, or movable motions.

In a preferred embodiment, the storage rack is attached only to one or more fixed length rotatable arms and the one or more fixed length rotatable arms are rotatably attached at one end to the storage rack and at an opposite end to the frame. Further, at a location in between these two ends, each of the one or more fixed length rotatable arms also provide a separate point of rotational connection with a variable length arm member.

The fixed length rotatable arm and variable length arm may each be provided in duplicate or in one or more matching pairs, and located on each lateral side of the adjustable rack. In a preferred embodiment, the fixed length rotatable arm may itself be comprised of multiple support arms. These support arms may work in concert, i.e., move together and have similar, though not identical, attachment locations for connection to the storage rack which facilitate maintaining a stable level surface of the storage rack. In a preferred embodiment, the points of connection between the support arms and the storage rack are rotatable, or provide for rotational movement at the connection points.

The adjustable rack apparatus of the present invention may be used in conjunction or together with a storage box that is either fixed to, integrated with, separate from, or separable from, the adjustable rack.

The adjustable rack apparatus and any of its components may be configured to collapse, or be divided into subcomponents, in order to occupy a smaller volume of space for ease of transport and shipping. Further, in certain embodiments of the present invention that include a storage box, the adjustable rack apparatus and any of its components may be configured to collapse, or be divided into subcomponents, for transport within the volume of space defined by the storage box. For example, the storage rack may be configured as two subcomponents for transport and shipping, and assembled upon or just prior to installation. In a preferred embodiment, the adjustable rack apparatus includes a storage box and all the non-storage box components of the adjustable rack apparatus fit within the storage box for ease of shipping and transport.

In a preferred embodiment, movement of any one of the fixed length rotatable arm, variable length arm, and storage rack interconnected movable components causes movement of the other two. That is, changing the length of the variable length arm causes rotatable movement of the fixed length rotatable arm and level and substantially vertical movement of the storage platform either up or down. Movement may be actuated by manually pulling up or down on the storage rack or remotely or electronically by use of additional conventional electronic components.

In alternative embodiments, the variable length arm is movably attached at one end to the storage box or frame and, at an opposite end, rotatably connected to the fixed length rotatable arm; meanwhile, the fixed length rotatable arm is rotatably connected at one end to the frame and, at an opposite end, to the storage rack; and the storage rack is only connected to the fixed length rotatable arm. Here, the variable length arm may be connected at a mid-point between each of the two ends of the fixed length rotatable arm.

Other preferred embodiments comprise, along at least one lateral side of the adjustable rack apparatus, a variable length arm that is movably fixed at one end to the storage box or frame and, at an opposite end, rotatably connected to the fixed length rotatable arm that comprises two support arms configured in a substantially parallel orientation and wherein the two support arms are each rotatably connected at spaced apart connection points at one end to the frame and, at an opposite end, to the storage rack, and wherein the storage rack is only connected to the fixed length rotatable arm. In some embodiments, the variable length arm may be statically fixed at one end to the frame or storage box.

In a preferred embodiment, level substantially vertical movement of the storage rack is achieved by proper positioning, or proper geometric placement, for example, in a triangular configuration, of the fixed length rotatable arm and the variable length arm relative to each other and the frame and the adjustable storage rack.

The configuration and the dimensions of each of the frame, the fixed length rotatable arm, and the variable length arm, may be understood to form a substantially triangular configuration or "triangle."

In a particularly preferred embodiment, only one side of this triangle, that is formed by the variable length arm, is configured to change in length. Accordingly, in this preferred embodiment, the rack apparatus can be understood to include a substantially triangular configuration formed by each of the frame (one side), the fixed length rotatable arm (second side), and the variable length arm (third side), wherein at least two of the interior angles of the triangle change upon movement of the variable length arm. In a most preferred embodiment, all three of the interior angles of the triangle change upon movement of the variable length arm because the bottom end of the variable length arm is movably attached to the frame or the optional storage box.

In a preferred embodiment, the fixed length rotatable arm extends past its connection point to the variable length arm to separately attach to the storage rack.

In an alternative embodiment, level vertical movement of the storage rack is achieved by proper positioning of the fixed length rotatable arm and the variable length arm relative to each other and the adjustable storage rack and the frame, or one of the optional storage box, or another static mounting surface. Any one or more of the three sides forming the triangle may be reversibly locked into position to prevent further movement.

It is noted that the configuration of the fixed length rotatable arm and variable length arm, as described herein, may be reversed or inverted. That is, the fixed length rotatable arm may link the frame or optional storage box at one end and, at an opposite end, to the variable length arm; meanwhile, the variable length arm may link the storage rack to the frame at each of its ends and, also include a joining mechanism somewhere along its length to permit rotatable connection to and movement between the variable length arm and the fixed length arms. Further, and as noted elsewhere, the joining mechanism between the variable length arm and the fixed length arm may be located at any location along the length of either the fixed length arms or variable length arms including, but not limited to, the mid-point between a first end and a second end of the fixed length arms.

In still other embodiments of the present invention, the storage rack may instead be a storage box or the storage box may instead be a storage rack. For example, the adjustable rack apparatus of the present invention may provide more than one storage box, and may provide one storage box that is adjustably located above another storage box. In one embodiment, the storage rack may provide a storage box with an interior level surface instead of an open level surface. In an alternative embodiment, the adjustable rack apparatus of the present invention may provide more than one storage rack, and may provide one storage rack that is adjustably located above another storage rack instead of a storage box or utility vehicle bed. In one alternative embodiment, the storage box is instead a storage rack. In various embodiments of the present invention, the storage box may or may not comprise a box lid.

Further description of each of the main component parts noted above is provided below in the following order: frame, storage rack, fixed length rotatable arms, variable length arms, and storage box.

Frame

The frame of the present invention provides a fixed point of reference relative to the vertically adjustable rack, the fixed length rotatable arm and the variable length arm. Although several embodiments of the present invention include a frame provided separately from the vehicle that is fixed to a surface upon installation and, also contemplated are various embodiments that instead refer to the vehicle itself as the "frame" and attach to the vehicle as produced. For example, the frame may be a vehicle cab, a roll-bar or a roll-cage. Thus, it is contemplated that the vehicle body itself or components thereof may be a frame in accordance with the present invention.

Materials used to make the frame can include one or more of aluminum (up to 100% aluminum), steel, carbon fiber, plastic, wood, etc. Aluminum is the most preferred material, followed by steel and carbon fiber. The frame may comprise a solid or hollow component. The frame can be provided in several configurations, including an upside-down "U" shape, an arch, a square or partial-square, flat-arched, multiple separate posts, ladder, etc. The frame may or may not include one or more cross members that may provide additional structural support or additional points of attachment for the user. The frame may or may not be collapsible.

Importantly, the frame provides at least one connection point in contact with each fixed length rotatable arm. The frame connection point with the fixed length rotatable arm may be configured as any one or more of a pin or bolt and a pivot point within the frame, a separate bracket mounted to the frame, and an opening in the frame itself for mounting the fixed length rotatable arm, etc. Further support for the frame connection points with the fixed length rotatable arm may be provided by inclusion of a bracket provided on the frame that, in turn, provides one or more connection points with the fixed length rotatable arm, or, alternatively, simply reinforces the connection points located on the frame.

In one embodiment, a bracket mounted to the frame is provided with one or more "ears," tabs, or protrusions extending beyond the frame, that provide pin and bolt and pivot point attachments such as mounting point holes for one or more fixed length rotatable arm attachments. In a preferred embodiment, a bracket is mounted to the frame and connects the fixed length rotatable arm to the adjustable storage rack. The bracket mounted to the frame is provided with one or two protruding extensions and provides pin and bolt pivot point attachments such as mounting point holes in each protruding extension. In this preferred embodiment, the pivot point attachments and mounting point holes for two pin and bolt attachments are located away from the frame body and between the protruding extensions on the bracket.

In one embodiment, no brackets are mounted in association with connecting either the variable length arm or the fixed length rotatable arm to the frame or the storage box. In another embodiment, brackets are mounted in association with connecting both the variable length arm and the fixed length rotatable arm to any of the frame, the vehicle itself, or the storage box. In still another embodiment, one bracket is mounted in association with connecting only one of the variable length arm or the fixed length rotatable arm to the frame or the storage box.

In a preferred embodiment, the frame is rigid, immovable, or fixed, and occupies a small footprint upon installation, e.g., about ½-4 square inches or, more preferably about 1¼ square inches, at each installation point, and is made of strong and durable materials.

The frame is also configured to be secured or mounted to a surface upon installation using at least one installation point. In one embodiment, the frame is mounted to the storage box. In another embodiment, the frame is a separate component secured or mounted to, or adjacent to, the cab of a utility vehicle. In still another embodiment, the frame is actually formed of the utility vehicle itself and may be, for example, a roll-bar or a roll-cage.

In a preferred embodiment, the frame is optimally located at the front of the utility vehicle bed, wherein the frame rises up adjacent to or directly against the back of the utility vehicle cab.

The frame may be of various sizes. The frame width (as measured, for example, from the interior-facing surfaces from each of the first and second frame installation points) may be from about 30 to 45 inches as measured from between the interior-facing surfaces from each of a first and second installation point, and preferably between about 40 to 41 inches for larger models and smaller for smaller models, e.g., about 35 to 40 inches, about 30 to 35 inches, etc. In a preferred embodiment, the frame width is selected to match, or conform to, the size of the utility vehicle bed. The frame height (as measured from the upper-facing installation surface to the vertical highest reaching, or vertical uppermost reaching, point of the frame) may be from about 20 to 60 inches between the upper-facing installation surface to the vertical highest reaching, or vertical uppermost reaching, point of the frame, and preferably is about 36 inches; although frame dimensions and heights may vary depending on the model.

In embodiments of the present invention further including a storage box, it is contemplated that the size of the storage box will be selected to match, or conform to, the size of the utility vehicle bed.

Storage Rack

The storage rack is advantageously configured to move substantially vertically while maintaining a level surface. Level substantially vertical movement of the adjustable storage rack is achieved by proper positioning of the fixed length rotatable arm and the variable length arm relative to each other and the frame and the adjustable storage rack to ensure a substantially level orientation of the level surface throughout the range of up and down motion provided by the storage rack. That is, the level surface of the storage rack substantially uniformly maintains a substantially level orientation regardless of whether the storage rack is in a lowered configuration, a raised or elevated configuration, or is actively in motion.

In a preferred embodiment, changing the length of the variable length arm causes rotatable movement of the fixed length rotatable arm and level substantially vertical movement of the storage rack along a vertical arc or arcuate pathway. The vertical arc or arcuate pathway is, in turn, defined by the length or radius and movement of the fixed length rotatable arm about its pivot or turning point.

Here, the term "level" is defined as being relative to the surface upon which the adjustable rack apparatus is secured or mounted upon installation, such as, for example, on the top surface of the optional storage box, or box lid, or a utility vehicle bed. According to the present invention, a "level" surface is, optimally, one that is about parallel to, or substantially parallel to, this surface; however, the term "level" also includes substantially level surfaces that are about 10° offset from parallel, or about 15° offset from parallel. If the utility vehicle is, for example, parked on a sloped surface, the level surface will still be level in accordance with the present invention because this term is relative to the mounting or installation surface of the adjustable rack apparatus.

Materials used to make the storage rack structure can include one or more of aluminum (up to 100% aluminum), steel, carbon fiber, plastic, wood, etc. Aluminum is the most preferred material, followed by steel and carbon fiber.

The storage rack may comprise a level surface, an outer perimeter, and a railing component, and together these components may be also referred to as the storage rack or storage rack structure. The storage rack may comprise solid or hollow components. The storage rack may or may not include one or more cross members that may provide additional structural support or additional points of attachment for the user. The storage rack may or may not be collapsible. The storage rack structure may provide an outer perimeter of a level surface of the storage rack which is, preferably, substantially rigid.

The storage rack can be provided in several configurations and may comprise multiple components, or pre-assembly subcomponents.

The level surface of the storage rack can be provided in several configurations, including a solid planar surface, a perforated planar surface, an open planar surface including one or more rungs or cross bars, a webbed surface, a flexible surface, etc., and, optionally, may comprise a combination of these configurations or may comprise multiple components or pre-assembly subcomponents. Materials used to make the level surface of the storage rack can include one or more of the aforementioned storage rack materials, and may include flexible materials such as cloth, netting, rubber, plastics, etc. The level surface of the storage rack may comprise solid or hollow components.

In a preferred embodiment, the storage rack structure and the level surface of the storage rack are provided as a single integrated component. For example, the storage rack structure and the level surface of the storage rack are preferably made from aluminum or, less preferably, steel and carbon fiber, and the level surface of the storage rack is integrally formed, fixed, or fused with the storage rack structure.

Another preferred embodiment provides the storage rack in multiple components or subcomponents to facilitate ease of shipping and may, optionally, allow for fitting and shipping the multiple components or subcomponents into the optional storage box. For example, the storage rack may comprise two components. In a preferred embodiment, the storage rack comprises two substantially equal pre-assembly components that connect to form a singular storage rack. Each of these components may be the mirror image of the other. The multiple components may be attached by any attachment mechanisms conventionally known to those in the art. In a preferred embodiment, the storage rack comprises two substantially equal components that connect by screws and bolts, or snap fit, to form a singular storage rack.

The storage rack may further comprise a top railing along one or more upward-facing surfaces of the storage rack structure such as, for example, the outer perimeter. Preferably, the top railing encircles the entire, or substantially all of, outer perimeter of the storage rack structure. The top railing may comprise a solid, perforated, or partially open wall between an upward-facing surface of the storage rack structure and the lowermost surface of an upper component of the top railing. The top railing assists securing items located on the level surface of the storage rack. The height of the top railing relative to the upward-facing level surface of the storage rack structure may vary between 1 and 30 inches, with a preferred height being between about 2 to 8 inches, and a more preferred height being about 3 to 6 inches.

In a preferred embodiment, the uppermost surface of the level surface of the storage rack is expected, upon activated movement, to vertically rise, in its maximally elevated configuration, to a height that is substantially equivalent to about 21 inches above the top of the optionally included storage box (which, in this embodiment, has a height of about 14 to 15 inches), or to about 35 to 36 inches above the top of the utility vehicle bed. In another embodiment, the upward-facing level surface of the storage rack is expected to vertically rise, in its maximally elevated configuration, to a height that is substantially parallel to, or even with, the top of the uppermost surface of the frame.

The top railing may be made from any of the materials used, for example, to make the storage rack structure, and any railing wall may be made from any of the materials used, for example, to make the level surface of the storage rack. In a preferred embodiment, the top railing and the storage rack structure are made from the same material. In another preferred embodiment, the top railing, storage rack structure, and level surface of the storage rack are integrally formed, fixed, or fused, each with the other. In another preferred embodiment, the top railing, storage rack, and level surface of the storage rack are assembled together from two or more components to form a substantially rigid structure.

In embodiments of the present invention further including a storage box, it is contemplated that the size of the storage box will be selected to match, or conform to, the size of the utility vehicle bed. Further, the storage rack may, in its lowered configuration, be positioned immediately above, or rest upon, or to be locked to the top surface of the storage box.

In one embodiment, the storage rack, in its lowered configuration, reversibly locks onto the storage box. Locking mechanisms to attach the storage rack to the storage box include cam over latches, hook latch, etc. It is noted that the storage box lid too may also be reversibly locked using cam over latches, hook latch, etc.

The storage rack of the present invention has a substantially vertical range of motion. Here, the terms "vertical" and "vertical range of motion" mean that the level surface of the storage rack moves substantially straight up and down, and includes movement along an arched or arcuate or circular pathway relative to the surface upon which the adjustable rack apparatus is secured or mounted upon installation.

In an alternative embodiment, the invention also encompasses a vertical range of motion that allows displacement of the geometric center of the storage rack when it is raised from a position immediately above the geometric center of surface upon which the adjustable rack apparatus is secured or mounted upon installation to a higher elevation. For example, alternative embodiments of the present invention may provide a substantially "vertical range of motion" that allows for an offset of the geometric center of the storage rack when it is raised relative to the geometric center of the surface upon which the adjustable rack apparatus is secured or mounted upon installation. Such an offset may result from movement of the storage rack along a substantially vertical circular pathway defined by rotation of the fixed length rotatable arm around its pivot point.

In a preferred embodiment, the present invention includes substantially vertical movement to a height that is substantially equivalent to about 21 inches above the top of the optionally included storage box (which, in this embodiment, has a height of about 14 to 15 inches), or to about 35 to 36 inches total where no storage box is provided. In another embodiment, the present invention includes substantially vertical movement where no storage box is provided to a total height ranging between about 12 to 60 inches, more preferably between about 16 to 54 inches, still more preferably between about 20 to 48 inches, and still more preferably between about 24 to 42 inches.

In one embodiment, the storage rack may be elevated and locked to any height within the full range of motion permitted by the adjustable rack apparatus. For safety, the storage rack should be stowed or locked in a lowered position while the vehicle is in motion. Locking the storage rack in an elevated, or raised, configuration may be spring assisted or otherwise structurally supported by attaching the storage rack to the frame, or locking any of the variable length arm or the fixed length rotatable arm into a static position.

In one embodiment, the storage rack may only be locked in either its fully elevated, or raised, configuration and in its fully lowered configuration. For example, the storage rack, in either its fully elevated and fully lowered configuration may be locked in place using, for example, a cam over latch, spring assist, hydraulic assist, electric assist, linear ratcheting mechanism, slam latch, bolt and pin latch, paddle latch, etc. In one embodiment, the storage rack may only be locked in one of its fully elevated, or raised, configuration or its lowered configuration. In one embodiment, the storage rack may additionally, in its fully elevated, or raised, configuration be locked to the frame using similar mechanisms as those described above and, optionally, may include additional structural supports such as ropes, cords, bungee cords, etc.

In a preferred embodiment, the storage rack is separate from, and not directly attached to or connected to, the frame and moves independent of the frame, but optionally may be locked or secured to the frame. In this embodiment, the storage rack is only movably attached or connected to the fixed length rotatable arm via one or more joining components.

The fixed length rotatable arm joining component, which may or may not comprise a bracket on the storage rack, may serve to maintain the storage rack in a secure and level orientation. The fixed length rotatable arm may be locked into position.

One or more storage rack joining components are located on at least one lateral side portion of the storage rack and, preferably, on both lateral side portions of the storage rack. In a preferred embodiment, the one or more joining components are located between two corners of the storage rack structure, preferably at about a mid-distance, or middle point, between the two corners defining a side lateral portion of the storage rack. In another embodiment, the one or more joining components are located anywhere between two corners of the storage rack structure. Preferably, a first joining component is located on the exterior surface of an upper lateral side portion of the storage rack structure and a second joining component is located on a lower lateral side portion of the storage rack structure.

Most preferably, the two joining components are provided in a vertical configuration on each lateral side portion of the storage rack structure, such that the first joining point is located above the second joining component. For example, one joining component may be attached to the storage rack railing along an upper perimeter of the storage rack structure and a second part of the joining component may be attached to a lateral side of the lower perimeter of the storage rack structure.

In one embodiment, the joining component comprises a bracket mounted to the storage rack that is provided with one or more protrusions extending beyond the storage rack that provide pin and bolt and a pivot point attachments and mounting point holes for one or more attachments. In another embodiment, a bracket mounted to the storage rack and connecting the fixed length rotatable arm to the adjustable storage rack is provided with one or two protruding extensions and provides pin and bolt and a pivot point attachments and mounting point holes for two bolts. In this other embodiment, the pivot point attachments and mounting point holes for two bolts are located away from the storage rack body and within the one or two protruding extensions of the bracket.

In one embodiment, no bracket is mounted to the storage rack in association with connecting the fixed length rotatable arm.

The Fixed Length Rotatable Arm

The fixed length rotatable arm may link the storage rack to the frame at two or more points on each lateral side of the rack apparatus, and also provides an attachment point for the variable length arm.

A fixed length rotatable arm of the present invention may comprise multiple support arms that substantially span the distance between the frame and the storage rack together with their associated connection mechanisms (to each of the storage rack and the frame, respectively) and these components may be collectively referred to as the fixed length rotatable arm. Specifically, the first end of the fixed length rotatable arm links to at least one joining component on the storage rack, and the second end of the fixed length rotatable arm connects to at least one connection point on the frame. Each optional support arm may also include a first end for connection to the storage rack and a second end for connection to the frame. Each optional support arm may be identical.

By connecting the storage rack to the frame at at least two distinct points, the fixed length rotatable arm allows for stable vertical movement of the storage rack and also maintains the level surface in a substantially parallel orientation over the storage rack's supporting surface. The connections may be any of those conventionally known in the art.

In a preferred embodiment, two support arms are provided and the uppermost support arm is rotatably connected to the storage rack by a screw or pin that extends from the lateral side of the storage rack, through a hole in the first end of the uppermost support arm, and is held in place by a nut. Also in this preferred embodiment, two support arms are provided and the uppermost support arm is rotatably connected to the frame by a screw or pin that extends from either side of a bracket provided on the frame and through a hole in the second end of the uppermost support arm, and is held in place by the bracket and a bolt.

Materials used to make the fixed length rotatable arm can include one or more of aluminum (up to 100% aluminum), steel, carbon fiber, plastic, wood, etc. Aluminum is the most preferred material, followed by steel and carbon fiber. The fixed length rotatable arm is rigid or substantially rigid and may comprise a solid or hollow component. In a preferred embodiment the materials used to make the fixed length rotatable arm are identical to those used to make the frame.

The fixed length rotatable arm may include two support arms, an upper support arm and a lower support arm, each of which is independently rotatable and connected at a first end to at least one connection point on the storage rack and at a second end to at least one connection point on the frame. In another embodiment, the fixed length rotatable arm is a single unit, i.e., a single unit that does not comprise separate support arms.

Between the first end and the second end of the fixed length rotatable arm is an intermediate portion, upon which is located a joining mechanism to a variable length arm. The joining mechanism may be located at any point along this intermediate portion. In a preferred embodiment, this joining mechanism is provided on a lowermost support arm of the fixed length rotatable arm, or the support arm closest to the apparatus's supporting surface, for example, the utility vehicle bed or the top of the optional storage box.

The length of the fixed length rotatable arm is designed to facilitate the desired range of permitted vertical movement of the storage rack. Contemplated lengths of the fixed length rotatable arm, or a support arm, include about 12 to 30 inches or about 15 to 20 inches. In a preferred embodiment, a support arm of the present invention includes two attachment holes, one at a first end and one at a second end, and is about 18 to 19 inches in length. The length of the fixed length rotatable arm will also define the circular path of the substantially vertical movement of the level surface of the storage rack.

The joining mechanism may be typically located about a mid-distance, or middle point, between the first end and the second end of the fixed length rotatable arm, but may be located anywhere between the first end and the second end provided that the resistance, force, and range of motion accounted for by movement of the rack apparatus is accounted for by appropriate placement of the joining mechanism. For example, placement of the joining mechanism on the fixed length rotatable arm at a point that is too close to the frame end of a support arm may make use of the rack apparatus to difficult due to the need for increased force to cause movement and/or diminish the stability of the storage rack when it is in its raised or lowered configurations. The joining mechanism may be attached or fixed to the fixed length rotatable arm and provides a rotatable or movable point of attachment for the variable length arm. For example, the joining mechanism may provide for rotation of the variable length arm may be a bolt and pin held by and within, or between a bracket, or other such similar mechanism attached to the fixed length rotatable arm and that passes through a hole located on a top end of the variable length arm located within the bracket.

Variable Length Arm

The variable length arm of the present invention may be located on each lateral side of the rack apparatus and include a top end and a bottom end, and may include one or more holes used to connect to the fixed length rotatable arm at a top end and, for example, the frame or optional storage box at a bottom end. The top end of the variable length arm allows rotatable connection to a joining mechanism located on the fixed length rotatable arm. The bottom end of the variable length arm may be movably attached to one of the frame or optional storage box. In a preferred embodiment, the bottom end of the variable length arm is attached to a storage box by a rotatable attachment. In an alternative embodiment, the variable length arm may be statically fixed to one of the frame or optional storage box.

The variable length arm may be one or more of a gas shock, electrically assisted shock or pole, torsion spring, a telescoping pole, a nested expandable ratcheting pole, a ratcheting type mechanism for manual operation, etc. Materials used to make the variable length arm can include one or more of aluminum (up to 100% aluminum), steel, carbon fiber, plastic, wood, etc. Steel is the most preferred material. In a particularly preferred embodiment, the variable length arm is a gas shock. In another particularly preferred embodiment, the variable length arm is a gas shock and two gas shocks are provided, one on each lateral side of the rack apparatus. The variable length arm is rigid and may comprise a solid or hollow component.

In a preferred embodiment, the joining mechanism includes a bracket that is fixed by welding or is welded to the fixed length rotatable arm and that provides a rotatable point of pin and bolt attachment for the variable length arm via a hole located in a top end the variable length arm. In this embodiment, the joining mechanism includes a bolt and pin held by a bracket attached to the fixed length rotatable arm, or other such mechanism, that extends and passes through the hole located on a top end of the variable length arm and that is held within the bracket.

In a preferred embodiment, the bottom end of the variable length arm attaches to the frame. In this embodiment, the frame attachment point is located proximal to the storage box and towards the front, or front most, portion of the frame. In a particularly preferred embodiment, the bottom end of the variable length arm is movably bolted or attached to the frame.

The variable length arm adjustably either increases or decreases in length to raise or lower the storage rack, respectively. That is, increasing or decreasing the length of the variable length arm causes substantially vertical movement of the storage rack. In a particularly preferred embodiment, increasing or decreasing the length of the variable length arm causes movement of the fixed length rotatable arm at each of its connections points, i.e., to the storage rack, to the frame, and to the variable length arm, resulting in elevation or lowering of the storage rack. As noted herein, the orientation and movement of the level surface of the storage rack is substantially level and movement up and down may follow a circular path. In a preferred embodiment, the orientation and movement of the level surface of the storage rack is substantially uniformly level throughout its range of motion.

The length of the variable length arm is designed to facilitate the desired range of permitted substantially vertical movement of the storage rack. Contemplated lengths of the variable length arm include about 12 to 30 inches or about 15 to 20 inches. In a preferred embodiment, the variable length arm includes two attachment holes, one at a top end and one at a bottom end, and is about 18 to 19 inches in length.

Movement of the variable length arm may be activated manually by pulling or pushing the storage rack up or down or electronically. Electronic activation may be accomplished using tools conventionally known to those in the art and may be remotely activated.

It is noted again here that the fixed length rotatable arm and the variable length arm may be used in the opposite configuration, i.e., where the fixed length rotatable arm and the variable length arm are switched.

The Optional Storage Box

The adjustable rack apparatus of the present invention may be used in conjunction with a storage box that is either fixed to, integrally formed with, separate from, or separable from, the adjustable rack. For example, the optional storage box may itself be attached, or removably attached, to the frame by, for example, bolts. The box may itself may also be secured or mounted to a surface within the vehicle bed using any conventionally available techniques, including the use of bolts or knob type expansion anchors and fasteners, or may be unmounted. Additionally, the box may be adapted for securing or mounting to plastic or specially molded utility beds that do not require tools for installation, such mounting mechanisms may include hole and plunger, cam over latch, and molded rubber and hole type approaches. The present invention contemplates inclusion of various types of securing or mounting mechanism to secure or mount the invention to a utility vehicle with model design driven, in large part, by different utility vehicle bed designs.

The storage box includes a lid that may be attached by a hinge mechanism or other such mechanism. Inside the storage box, the lid may be equipped with additional components that may be similar to the variable length arm such as, for example, gas shocks, etc., and that might be used to assist opening the lid, or maintaining the lid in an open or closed configuration. While gas shocks are specifically mentioned here, it is contemplated that any of the variable length arm types referenced above, including the means of their attachment of connection to fixed surfaces, may be suitable for application to the inside of the storage box as well.

Materials used to make the storage box can include one or more of aluminum (up to 100% aluminum), steel, carbon fiber, plastic, wood, etc. Aluminum is the most preferred material, followed by steel and carbon fiber.

In a preferred embodiment, the storage box is waterproof or water-resistant or, otherwise, weather resistant.

In another preferred embodiment, the storage box is insulated to serve as a food and beverage cooler.

In yet another embodiment, the storage box includes a releasable drain plug to allow interior contents to drain in place.

DESCRIPTION OF DRAWINGS

The details of one or more embodiments of the invention are set forth in the accompanying drawings and the description below. Other features, objects, and advantages of the invention will be apparent from the description and drawings, and from the claims.

FIGS. 2-11 each depict various views of an adjustable storage rack of the present invention with a storage box. FIG. 2 depicts a back and side perspective view wherein the storage rack is in a lowered configuration such that the storage rack rests on or is located on the top surface of the storage box lid. FIG. 3 depicts a front and side perspective view wherein the storage rack is in a lowered configuration such that the storage rack rests or is located on the top surface of the storage box lid. FIG. 4 depicts a top plan view. FIG. 5 depicts a bottom plan view. FIG. 6 depicts a back plan view. FIG. 7 depicts a front plan view. FIG. 8 depicts a side plan view wherein the storage rack is in a lowered configuration such that the storage rack rests or is located on the top surface of the storage box lid. FIG. 9 depicts a side plan view relative to FIG. 8 and wherein the storage rack is in a raised or elevated configuration such that the storage rack is elevated over the top surface of the storage box lid. FIG. 10 depicts a side plan view relative to FIG. 8 and FIG. 9 and wherein the storage rack is in a further raised or elevated configuration such that the storage rack is elevated over the top surface of the storage box lid. The movement arrows in FIG. 9 and FIG. 10 indicate the circular substantially vertical movement of the storage rack. FIG. 11 depicts a side plan view relative to FIG. 10 wherein the storage rack is in a further raised or elevated configuration such that the storage rack is elevated over the top surface of the storage box lid and the storage box lid is open.

FIG. 12 also shows additional gas shocks inside the storage box to support the opening or closing of the storage box lid.

FIG. 14 and FIG. 15 provide another bottom and back angled perspective view of an adjustable rack apparatus of the present invention, wherein FIG. 15 depicts the storage box, in part, in broken line in order to show the mechanisms inside the storage box that assist the opening and closing of the storage box lid.

DETAILED DESCRIPTION

Reference numbers used in association with various features of the present inventive embodiments described below are shared across the Figures. Identification of a feature in one Figure is intended to apply to that same feature across all Figures regardless of whether such feature is again specifically identified with a reference identifier. That is, some of the figures do not call out each of the features to prevent overcrowding of the figures. It is noted that the fixed length rotatable arms 100 may or may not comprise one or more support arms, but as depicted here comprise two support arms 108, an upper support arm 116 and a lower support arm 118. Also, the embodiment shown here includes the optional storage box. Additionally, as depicted, the frame is a separate component. The embodiments specifically depicted in the Figures and described below are, in no way, intended to be limiting.

Figure 1:
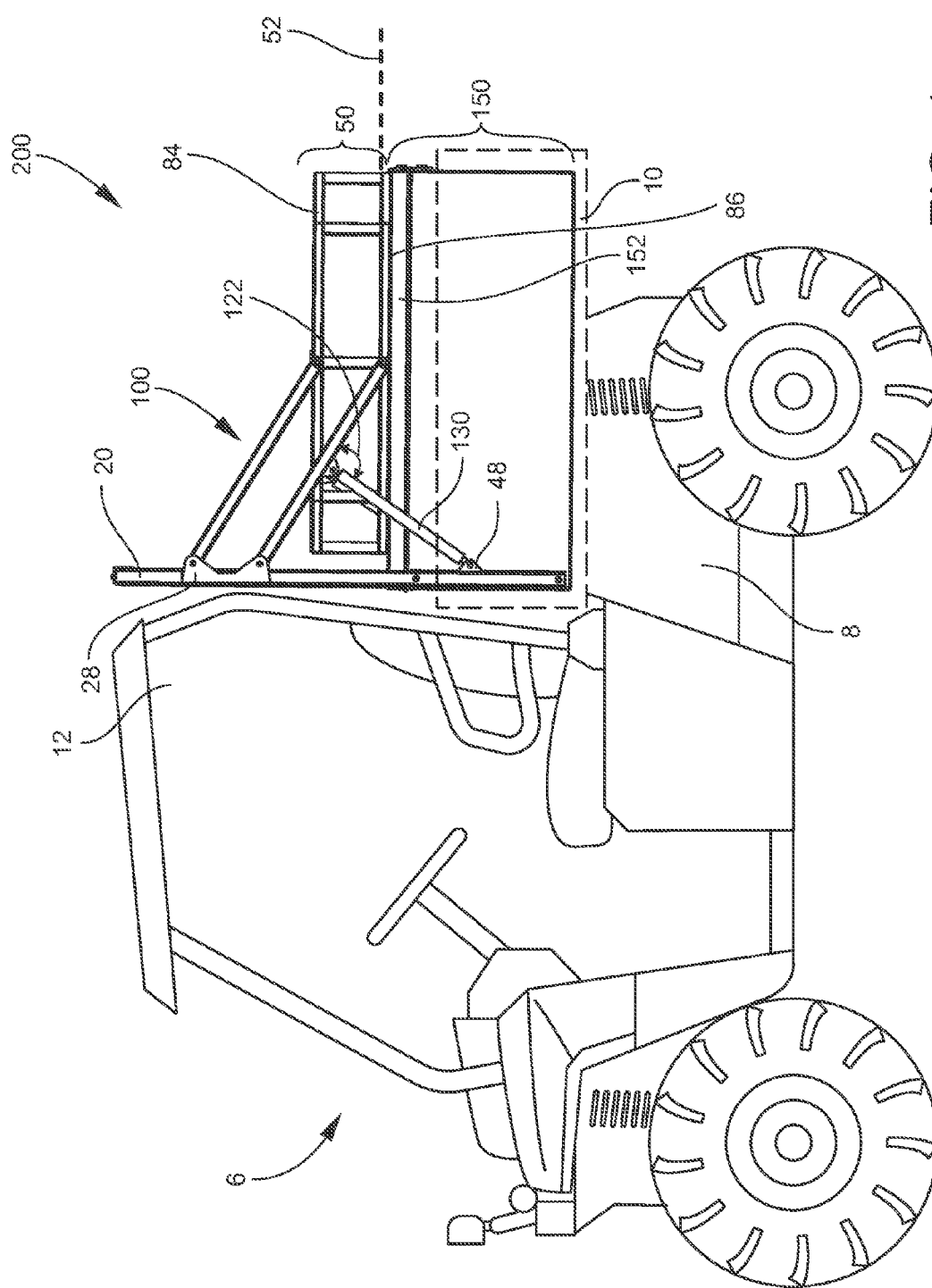
FIG. 1 depicts the side view of an adjustable storage rack of the present invention in association with a utility vehicle. The adjustable storage rack depicted in FIG. 1 is shown to occupy substantially all of the utility vehicle bed. In many embodiments of the present invention, however, the adjustable storage rack does not occupy substantially all of the utility vehicle bed. In some embodiments of the present invention, the adjustable storage rack provides several inches of clearance on one or both lateral sides between the storage rack apparatus and an outer perimeter edge of the utility vehicle bed.

FIG. 1 depicts the side view of an adjustable storage rack 200 of the present invention in association with a utility vehicle 6. This embodiment of the present invention includes the optional storage box 150. As depicted the adjustable storage rack 200 and box 150 are located in the vehicle bed 10 (here depicted in dotted line). Frame 20 is located adjacent to the vehicle cab 12. Upper bracket 28 is provided on the frame 20 and provides connection points at first end of the fixed length rotatable arm 100. Storage rack 50 provides connection points, on each of a railing upper perimeter 84 and a railing lower perimeter 86, at a second end of the fixed length rotatable arm 100. Joining mechanism 122 provides an attachment point at a top end of the variable length arm 130, and the bottom end of the variable length arm 130 attaches to lower bracket 48 on frame 20. The storage rack 50 provides a level surface 52. The adjustable storage rack 200 is shown in its lowered configuration and the storage rack 50 is shown resting on top of the storage box lid 152.

FIGS. 2, 3, 4, 5, 6, 7, 8, 9, 10, and 11 each depict various views of an adjustable storage rack 200 that includes the optional storage box 150. Accordingly, reference numbers identifying shared features are, similarly, shared between these Figures, even if not specifically called out on each of the separate figures.

Figure 2:
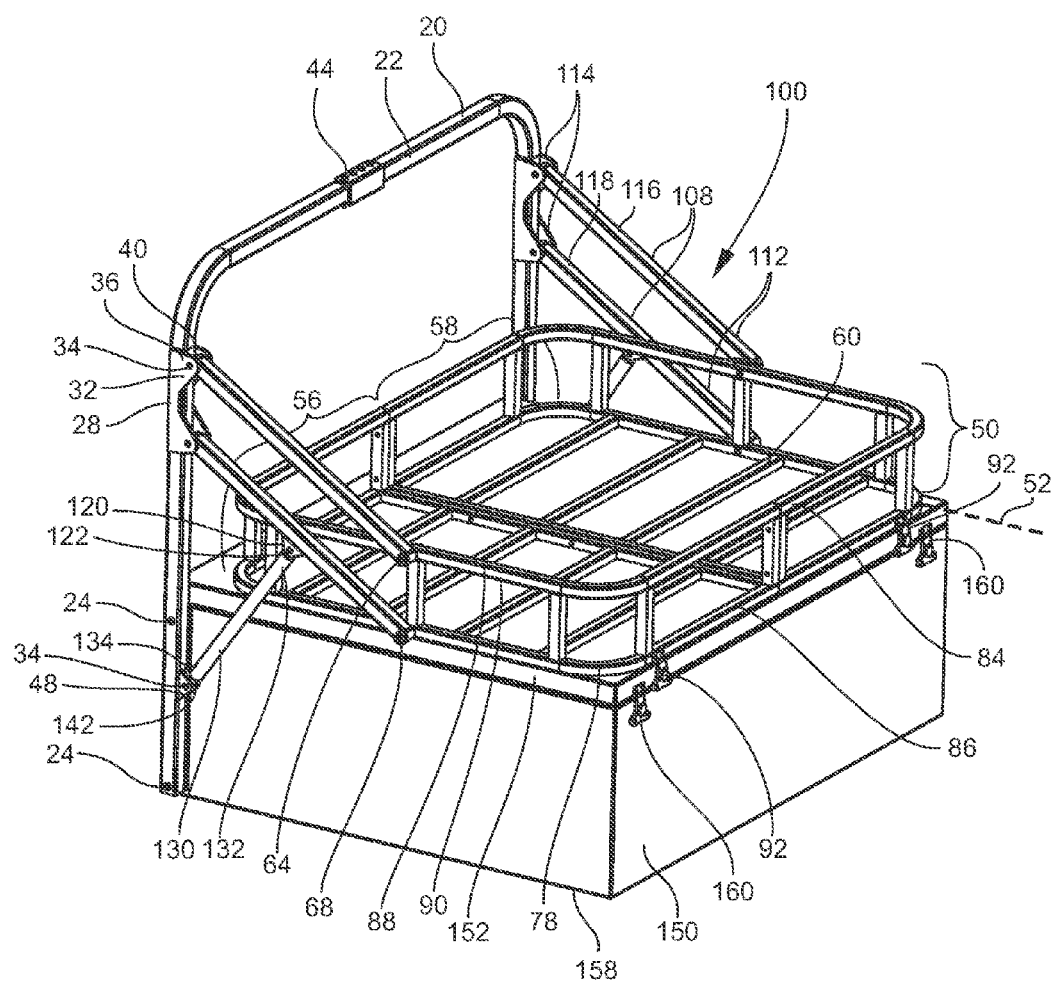

FIG. 2 depicts a back and side perspective view wherein the adjustable storage rack 200 is in a lowered configuration such that the storage rack 50 rests or is located on the top surface of the storage box lid 152. Frame 20 is shown with the frame body 22 provided in an arch form. Frame bolts 44 secure the frame body 22 components.

Frame 20 includes an upper bracket 28 and a lower bracket 48. Upper bracket 28 is mounted onto the frame body 22 by welding. Upper bracket 28 includes two protruding tabs 32, each having a hole 38 (not shown here due to insertion of bolt or pin 34), that provides a bracket pivot point 36 via a bracket bolt or pin 34. Upper bracket 28 provides movable connection points 40 at a first end of the fixed length rotatable arm 100. Bottom bracket 48 also includes a bracket hole 38 (not shown here due to insertion of bolt or pin 34), that provides a bracket pivot point via a bracket bolt or pin 34. Bottom bracket 48 provides a movable connection point 142 for variable length arm 130. Specifically, a variable length arm bottom end 134 attaches to connection point 142 at the bottom bracket 48; meanwhile, a variable length arm top end 132 attaches to joining mechanism 122 which forms part of bracket 120 on a lower support arm 118 of the fixed length rotatable arm 100. Frame bolts 24 attach the frame 20 to the storage box 150.

The fixed length rotatable arms 100 shown here comprise support arms 108. Each lateral side of the adjustable rack apparatus 200 includes two support arms 108, an upper support arm 116, and a lower support arm 118. Each support arm 108 includes a support arm first end 112 that attaches to the storage rack 50, and a support arm second end 114 that attaches to the frame 20. As depicted here, each of the upper support arm 116 and lower support arm 118 first ends 112 attach to distinct locations on the storage rack 50. Specifically, the upper support arm 116 first end 112 attaches to the railing upper perimeter 84 at a first joining component 64; meanwhile the lower support arm 118 first end 112 attaches to the railing lower perimeter 86 at a second joining component 68. The railing upper perimeter 84 includes a railing component upper surface 88, and a railing component lower surface 90.

Rack 50 is provided as a first structure component 56 and a second structure component 58, and includes four rounded corners 78. The rack 50 includes rack cross members 60 that provide a level surface 52. Rack locking mechanisms 92 can be used to lock or secure rack 50 to the storage box lid 152. In another preferred embodiment, the rack locking mechanism can be used to lock or secure the rack 50 to the storage box 150.

Storage box 150 is shown with locking mechanisms 160 that serve to lock the storage box lid 152 closed and secure to storage box 150. Storage box attachment surface 158 is provided as or on the bottom surface of storage box 150.

Figure 3:
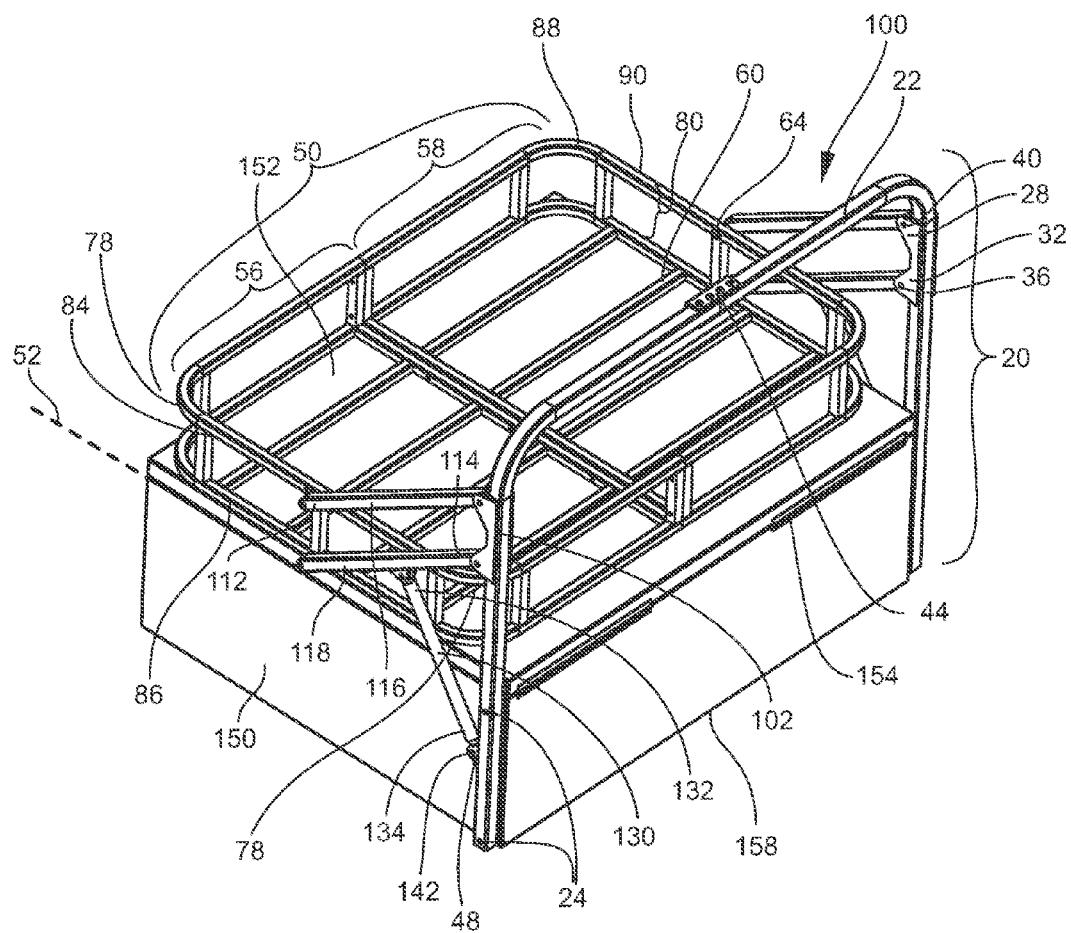

FIG. 3 refers to the same features as noted above, but additionally shows the storage box hinge 154.

Figure 4:
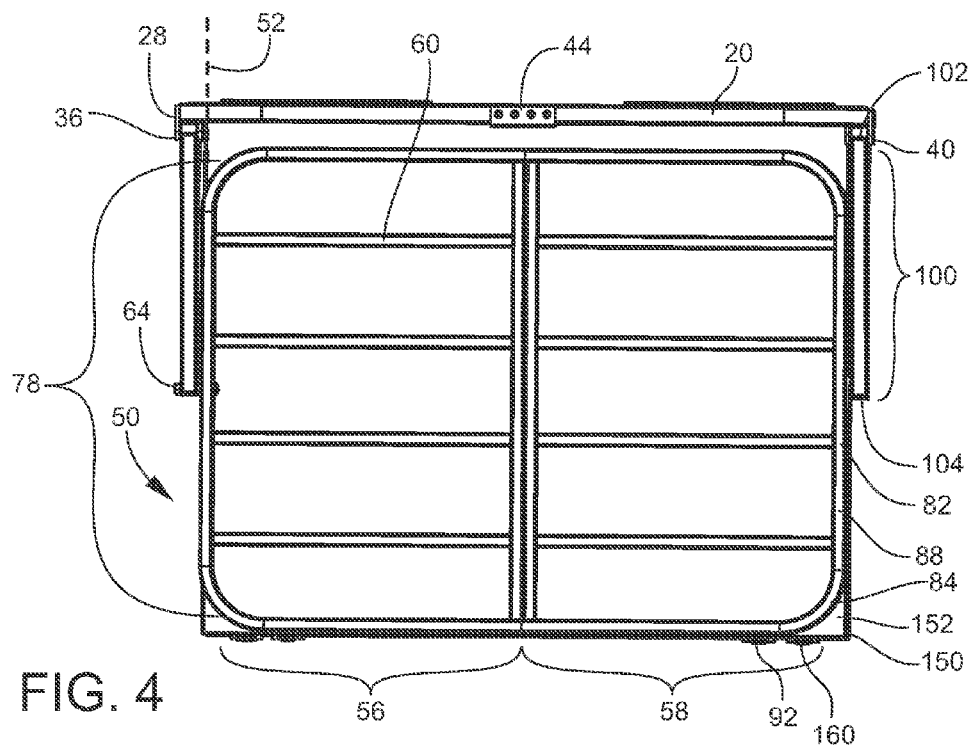

FIG. 4 depicts the adjustable rack apparatus 200 from a top view. The fixed length rotatable arms 100 are provided with a frame connection point 40 shown at one end, and a storage rack connection point 104 shown at the other end. In this figure, railing component 82 is noted, which component includes and is defined by the railing upper perimeter 84 and the railing lower perimeter 86. All other features provided with reference identifiers are discussed above in connection with at least FIG. 2.

Figure 5:
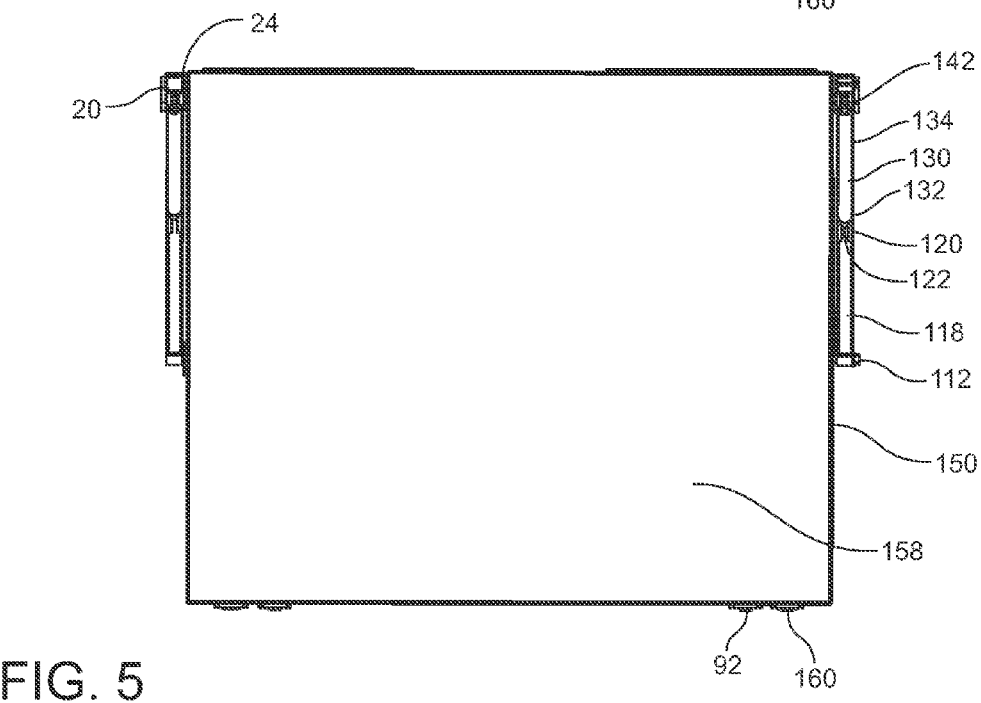

FIG. 5 depicts the adjustable rack apparatus 200 from a bottom view. FIG. 5 depicts a view of the variable length arm 130 movable attachment point 142. All other features provided with reference identifiers are discussed above in connection with at least FIG. 2 and FIG. 3.

Figure 7:
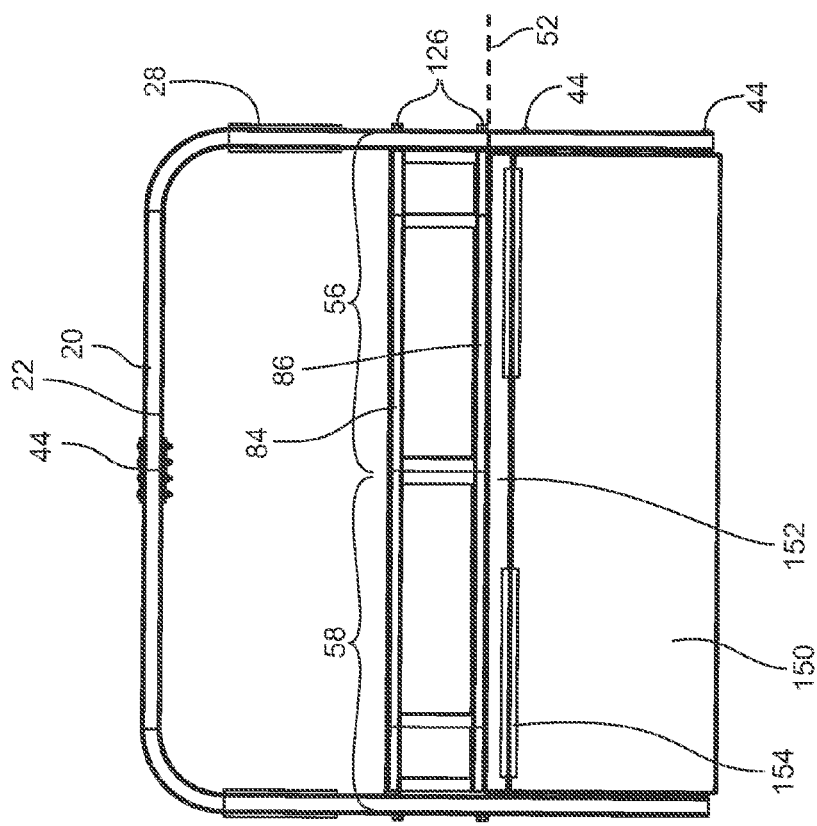
Figure 6:
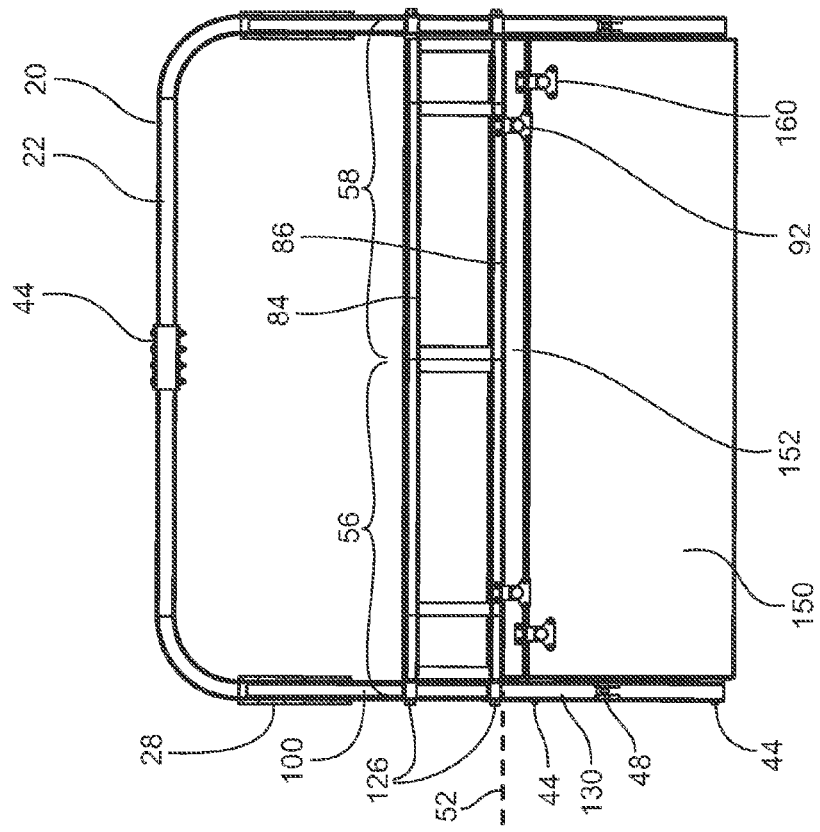

FIG. 6 and FIG. 7 show a back view or a front view of the adjustable rack apparatus 200, respectively. The fixed length rotatable arms 100 bolts 126 are additionally provided with a reference identifier. All other features provided with reference identifiers are discussed above in connection with at least FIG. 2 and FIG. 3.

FIG. 8, FIG. 9, FIG. 10, and FIG. 11 depict the adjustable rack apparatus 200 in various stages of substantially vertical motion 94 or in stopped or fixed lowered or elevated configurations. Specifically, FIG. 8 provides a side view of the adjustable rack apparatus 200 in a stopped lowered configuration. FIG. 9 provides a side view of the adjustable rack apparatus 200 in a partially elevated configuration, having moved through a semi-circular motion. The fixed length rotatable arms comprise an upper support arm 116 and a lower support arm 118 which, in this partially elevated configuration, are shown to be substantially horizontal and parallel to, the storage box lid 152. The adjustable rack apparatus 200 may or may not be locked or fixed in this partially elevated position. FIGS. 10 and 11 provide side views of the adjustable rack apparatus 200 in an elevated configuration, wherein the storage box lid 152 is either closed or open. As shown here, the rack 50 of the adjustable rack apparatus 200 has achieved a substantially vertical motion 94, even while it moved through a semi-circular motion 94 path before arriving at an elevated position wherein the rack is located substantially immediately above its location on the storage box lid 152 (as shown in FIG. 8). As the storage box lid 152 is shown open in FIG. 11, also depicted are box lid gas shocks 162 and the box lid variable length arm top end 164 which attaches to the underside of the box lid 152. All other features provided with reference identifiers are discussed above in connection with at least FIG. 2 and FIG. 3.

Figure 12:
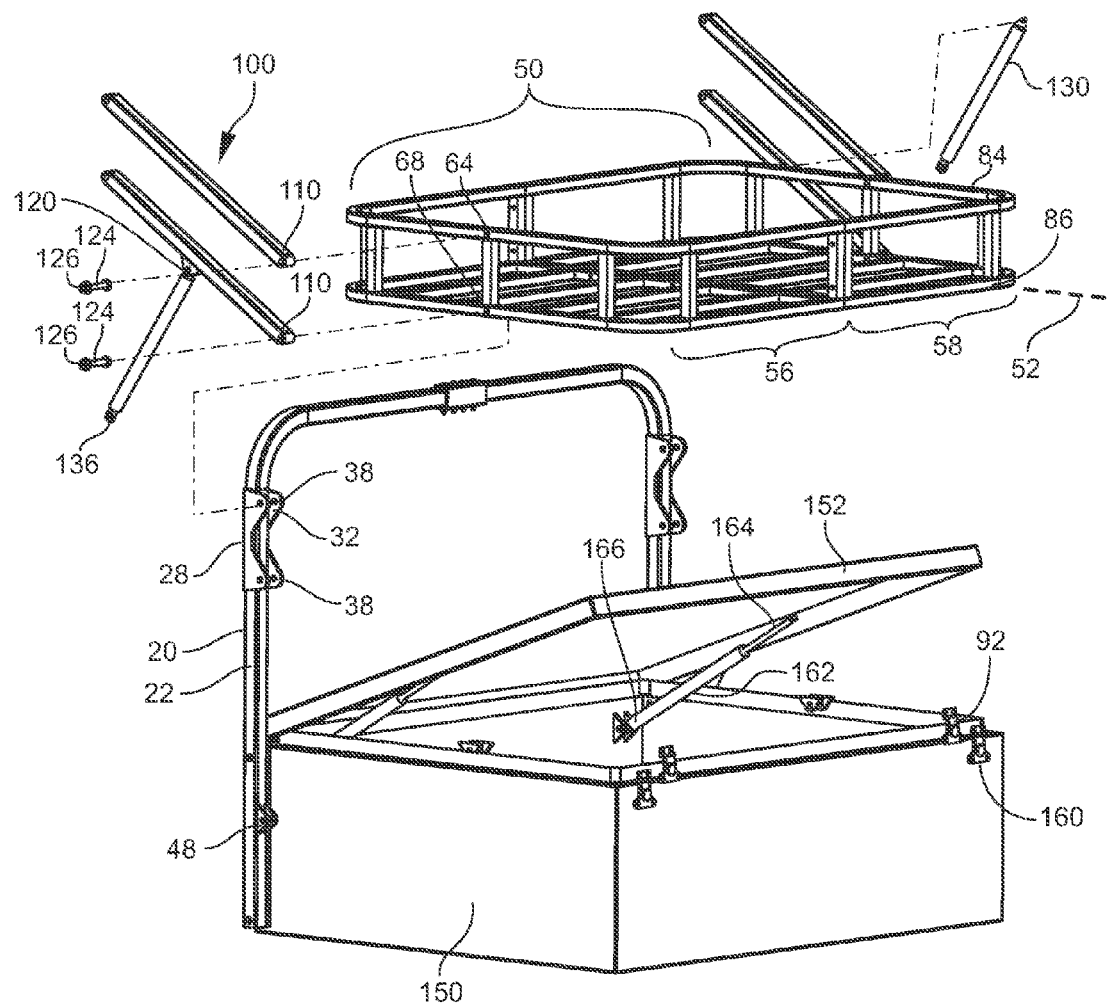
FIG. 12 provides a partially exploded view of an adjustable rack apparatus of the present invention to provide further detail as to the configuration and attachment of the fixed length rotatable arms and the variable length arms.

FIG. 12 provides a partially exploded view of an adjustable rack apparatus 200 to provide further detail as to the configuration and attachment of the fixed length rotatable arms 100 and the variable length arms 130. This figure also shows additional box gas shocks 162, including top end 164 and bottom end 166 inside the storage box to support the opening or closing of the storage box lid 152. Support arm holes 110 are specifically called out along with screws or pins 124 and bolts 126. Also indicated are the storage rack 50 first joining component 64 and second joining component 68. Upper bracket holes 38 are also shown. All other features provided with reference identifiers are discussed above in connection with at least FIG. 2 and FIG. 3.

Figure 13:
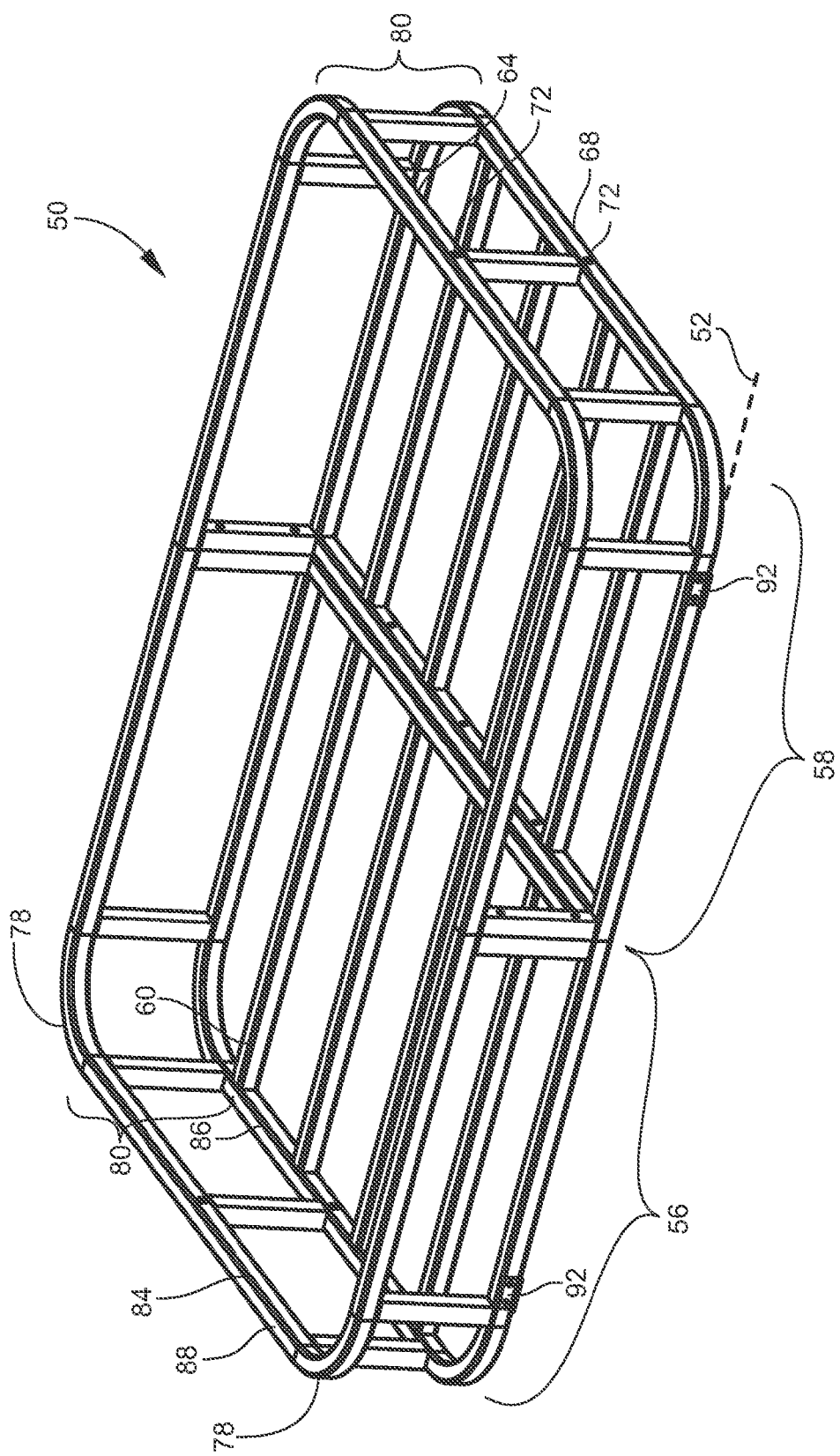
FIG. 13 depicts a storage rack of an adjustable rack apparatus of the present invention that comprises two components, wherein each component is substantially the mirror image of the other.

FIG. 13 depicts a storage rack 50 of an adjustable rack apparatus 200, and newly provides a reference identifier for a rack hole 72 and a rack lateral side 80. All other features provided with reference identifiers are discussed above in connection with at least FIG. 2 and FIG. 3.

Figure 14:
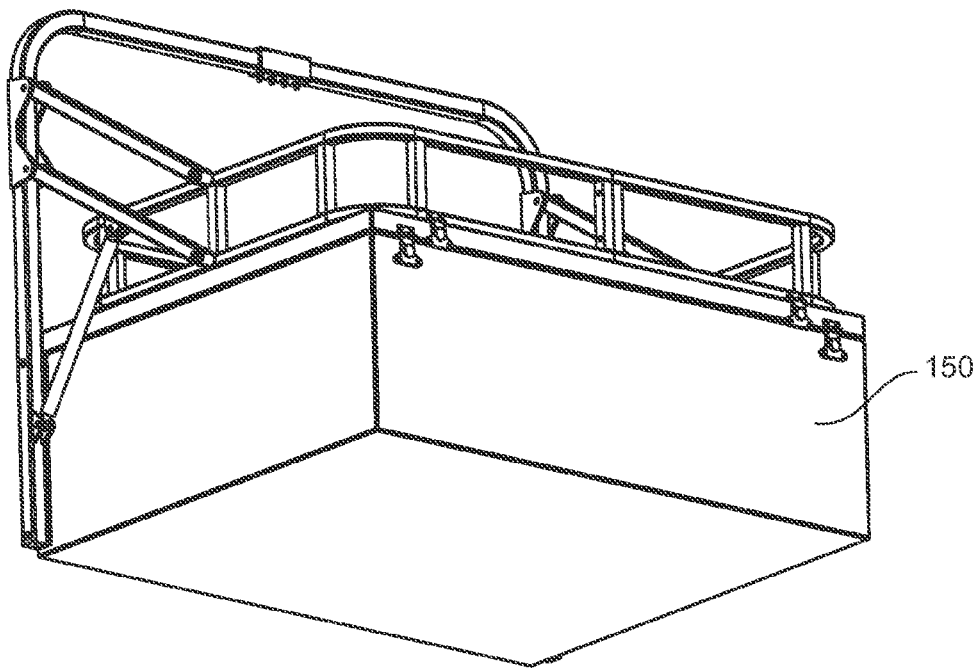
Figure 15:
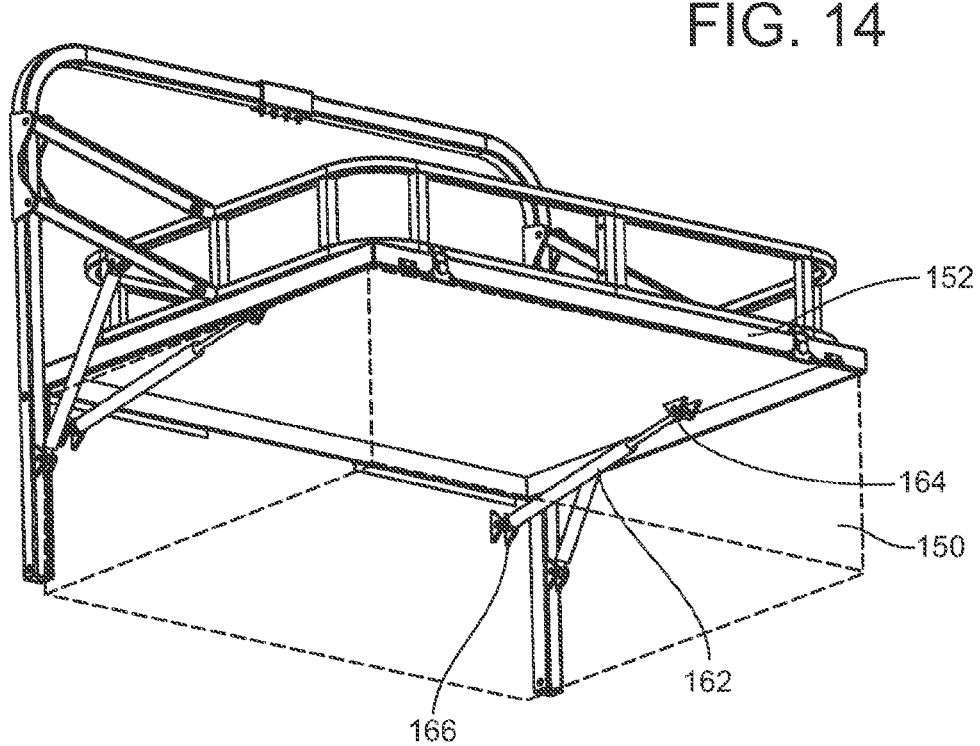

FIG. 14 and FIG. 15 provide another bottom and back angled perspective view of an adjustable rack apparatus 200, wherein FIG. 15 depicts the storage box 150, in part, in broken line in order to show the mechanisms inside the storage box, here the box lid gas shocks 162 that assist the opening and closing of the storage box lid. All other features provided with reference identifiers are discussed above in connection with at least FIG. 2, FIG. 3, and FIG. 12.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

The invention claimed is:

1. A substantially vertically adjustable rack apparatus comprising a single fixed frame connecting a first lateral side and a second lateral side of the rack apparatus, a fixed length rotatable arm comprising an upper support arm and a lower support arm, a variable length arm, a storage box, and a storage rack with a railing component, wherein a second end of either the upper support arm or the lower support arm and a bottom end of the variable length arm connect to the frame on the first lateral side or the second lateral side of the rack apparatus, and a first end of the upper support arm attaches to a top railing of the railing component, insert wherein the top railing encircles all or substantially all of the perimeter of the storage rack, and wherein the storage rack includes a substantially level surface in both a lowered configuration and an elevated configuration, and during motion.

2. The substantially vertically adjustable rack apparatus of claim 1, wherein the fixed length rotatable arm provides movable connection to the storage rack and to the variable length arm.

3. The substantially vertically adjustable rack apparatus of claim 1, wherein the variable length arm is a gas shock that is rotatably connected at a top end to either the upper support arm or the lower support arm.

4. The substantially vertically adjustable rack apparatus of claim 1, wherein the fixed length rotatable arm, the variable length arm, and the frame are provided in a substantially triangular configuration relative to the frame, and the second end of either the upper support arm or the lower support arm and the bottom end of the variable length arm connect to the frame in a substantially vertical alignment.

5. The substantially vertically adjustable rack apparatus of claim 1, wherein the storage rack comprises two components each of which is substantially the mirror image of the other.

6. The substantially vertically adjustable rack apparatus of claim 1, wherein the railing component comprises a perforated or partially open wall between an upward-facing surface of the storage rack and the top railing.

7. The substantially vertically adjustable rack apparatus of claim 1, wherein the storage rack comprises one or more cross members.

8. A rack apparatus comprising a fixed length rotatable arm comprising an upper support arm and a lower support arm, a storage box, and a fixed frame connecting a first lateral side and a second lateral side of the rack apparatus with an adjustable storage rack, wherein the adjustable storage rack has a railing component and a substantially vertically movable level surface and is located between the first lateral side and the second lateral side and is movably connected to the frame on both the first lateral side and the second lateral side by a second end of either the upper support arm or the lower support arm and a bottom end of a variable length arm and wherein a first end of the upper support arm attaches to a top railing of the railing component, wherein the top railing encircles all or substantially all of the perimeter of the storage rack, and wherein either the upper support arm or the lower support arm is also movably connected to a top end of the variable length arm.

9. The rack apparatus of claim 8, wherein the variable length arm is a gas shock.

10. The rack apparatus of claim 8, wherein each of the upper support arm and the lower support arm has a hole for movable connection to the storage rack.

11. The rack apparatus of claim 8, wherein the fixed length rotatable arm, the variable length arm and the frame are provided in a substantially triangular configuration relative to the frame, and the second end of either the upper support arm or the lower support arm and the bottom end of the variable length arm connect to the frame in a substantially vertical alignment.

12. The rack apparatus of claim 11, wherein the storage rack is not directly connected to the frame.

13. The rack apparatus of claim 8, wherein the storage rack comprises one or more cross members.

14. A method of using a rack apparatus comprising:
adjusting the rack apparatus in a substantially vertical manner relative to a fixed frame that connects a first lateral side of the rack apparatus and a second lateral side of the rack apparatus to raise or lower a storage rack with a railing component;
causing rotation of a fixed length rotatable arm comprising an upper support arm and a lower support arm, wherein either the upper support arm or the lower support arm is attached at a second end to the frame, and the upper support arm is attached at a first end to a top railing of the railing component, wherein the top railing encircles all or substantially all of the perimeter of the storage rack;
increasing or decreasing the length of a variable length arm that is attached at a bottom end to the frame and at a top end to either the upper support arm or the lower support arm;
maintaining a substantially level surface as part of the storage rack; and
locating a storage box under the storage rack.

15. The method of claim 14, further comprising:
rotating the first end of the upper support arm and a first end of the lower support arm at two separate points of connection to the storage rack.

16. The method of claim 14, further comprising:
opening a lid of the storage box when the storage rack is elevated.

17. The method of claim 16, further comprising:
locking the storage rack to the storage box when the storage rack is lowered.

18. The method of claim 14, further comprising:
assembling the storage rack from two components each of which is substantially the mirror image of the other.

19. The method of claim 14, further comprising:
connecting the second end of either the upper support arm or the lower support arm and the bottom end of the variable length arm to the frame in a substantially vertical alignment.

* * * * *